(12) United States Patent
Hall et al.

(10) Patent No.: US 7,253,745 B2
(45) Date of Patent: Aug. 7, 2007

(54) CORROSION-RESISTANT DOWNHOLE TRANSMISSION SYSTEM

(75) Inventors: David R. Hall, Provo, UT (US); Scott Steven Dahlgren, Alpine, UT (US); Pierre A. Smith, Orem, UT (US)

(73) Assignee: IntelliServ, Inc., Provo, UT (US)

( * ) Notice: Subject to any disclaimer, the term of this patent is extended or adjusted under 35 U.S.C. 154(b) by 234 days.

(21) Appl. No.: 10/907,177

(22) Filed: Mar. 23, 2005

(65) Prior Publication Data

US 2005/0150653 A1 Jul. 14, 2005

Related U.S. Application Data

(63) Continuation-in-part of application No. 10/604,812, filed on Aug. 19, 2003, now Pat. No. 7,064,676, which is a continuation of application No. 09/816,766, filed on Mar. 23, 2001, now Pat. No. 6,670,880, which is a continuation-in-part of application No. 09/619,804, filed on Jul. 19, 2000, now abandoned.

(51) Int. Cl.
*G01V 3/00* (2006.01)

(52) U.S. Cl. .............. 340/854.4; 340/854.5; 340/853.1; 340/854.6; 166/177; 166/178; 166/179

(58) Field of Classification Search ........... 340/854.4, 340/853.1, 854.5; 166/178, 179, 424.5, 177
See application file for complete search history.

(56) References Cited

U.S. PATENT DOCUMENTS

| | | | |
|---|---|---|---|
| 2,414,719 A | 1/1947 | Cloud | |
| 3,518,608 A | 6/1970 | Papadopoulos | |
| 4,739,325 A | 4/1988 | MacLeod | |
| 4,788,544 A | 11/1988 | Howard | |
| 4,806,928 A * | 2/1989 | Veneruso | 340/853.3 |
| 5,334,801 A * | 8/1994 | Mohn | 174/47 |
| 6,012,015 A | 1/2000 | Tubel | |
| 6,252,518 B1 | 6/2001 | Laborde | |
| 6,392,317 B1 | 5/2002 | Hall et al. | |
| 6,670,880 B1 | 12/2003 | Hall et al. | |
| 6,688,396 B2 | 2/2004 | Floerke et al. | |
| 6,717,501 B2 | 4/2004 | Hall et al. | |
| 6,799,632 B2 | 10/2004 | Hall et al. | |

(Continued)

OTHER PUBLICATIONS

PCT/US03/16475, Published Dec. 4, 2003, Applicant Baker Hughes; international Search Report; "Documents Considered to be Relevant".

*Primary Examiner*—Jeffery Hofsass
*Assistant Examiner*—Sisay Yacob
(74) *Attorney, Agent, or Firm*—Daniel P. Nelson; Tyson J. Wilde; Jeffery E. Daly (57) ABSTRACT

An apparatus in accordance with the invention may include a downhole tool and a data transmission path incorporated into the downhole tool. The data transmission path may include one or more contact surfaces providing electrical continuity to the data transmission path. To protect the contact surfaces from corrosion while maintaining electrical conductivity, a coating may be attached to one or more of the contact surfaces. The coating may include any of various materials that increase the corrosion-resistance of the underlying base metal, including but not limited to cobalt, nickel, tin, tin-lead, platinum, palladium, gold, silver, zinc, or combinations thereof.

14 Claims, 8 Drawing Sheets

U.S. PATENT DOCUMENTS

| | | |
|---|---|---|
| 6,821,147 B1 | 11/2004 | Hall et al. |
| 6,830,467 B2 | 12/2004 | Hall et al. |
| 6,844,498 B2 | 1/2005 | Hall et al. |
| 6,866,306 B2 | 3/2005 | Boyle et al. |
| 6,888,473 B1 | 5/2005 | Hall et al. |
| 6,913,093 B2 | 7/2005 | Hall et al. |
| 6,929,493 B2 | 8/2005 | Hall et al. |
| 6,945,802 B2 | 9/2005 | Hall et al. |
| 6,968,611 B2 | 11/2005 | Hall et al. |
| 2004/0039466 A1 | 2/2004 | Lilly et al. |
| 2004/0104797 A1 | 6/2004 | Hall et al. |
| 2004/0113808 A1 | 6/2004 | Hall et al. |
| 2004/0145492 A1 | 7/2004 | Hall et al. |
| 2004/0150532 A1 | 8/2004 | Hall et al. |
| 2004/0164833 A1 | 8/2004 | Hall et al. |
| 2004/0164838 A1 | 8/2004 | Hall et al. |
| 2004/0216847 A1 | 11/2004 | Hall et al. |
| 2004/0244916 A1 | 12/2004 | Hall et al. |
| 2004/0244964 A1 | 12/2004 | Hall et al. |
| 2004/0246142 A1 | 12/2004 | Hall et al. |
| 2005/0001735 A1 | 1/2005 | Hall et al. |
| 2005/0001736 A1 | 1/2005 | Hall et al. |
| 2005/0001738 A1 | 1/2005 | Hall et al. |
| 2005/0035874 A1 | 2/2005 | Hall et al. |
| 2005/0035875 A1 | 2/2005 | Hall et al. |
| 2005/0038507 A1 | 2/2005 | Hall et al. |
| 2005/0038876 A1 | 2/2005 | Hall et al. |
| 2005/0039912 A1 | 2/2005 | Hall et al. |
| 2005/0045339 A1 | 3/2005 | Hall et al. |
| 2005/0046580 A1 | 3/2005 | Hall et al. |
| 2005/0046588 A1 | 3/2005 | Hall et al. |
| 2005/0067159 A1 | 3/2005 | Hall et al. |
| 2005/0070144 A1 | 3/2005 | Hall et al. |
| 2005/0082092 A1 | 4/2005 | Hall et al. |
| 2005/0092499 A1 | 5/2005 | Hall et al. |
| 2005/0093296 A1 | 5/2005 | Hall et al. |
| 2005/0095827 A1 | 5/2005 | Hall et al. |
| 2005/0115717 A1 | 7/2005 | Hall et al. |
| 2005/0145408 A1 | 7/2005 | Hall et al. |
| 2005/0150853 A1 | 7/2005 | Hall et al. |
| 2005/0161215 A1 | 7/2005 | Hall et al. |
| 2005/0173128 A1 | 8/2005 | Hall et al. |
| 2005/0212530 A1 | 9/2005 | Hall et al. |
| 2005/0236160 A1 | 10/2005 | Hall et al. |
| 2005/0279508 A1 | 12/2005 | Hall et al. |
| 2005/0284659 A1 | 12/2005 | Hall et al. |
| 2005/0284662 A1 | 12/2005 | Hall et al. |
| 2005/0284663 A1 | 12/2005 | Hall et al. |
| 2005/0285645 A1 | 12/2005 | Hall et al. |
| 2005/0285705 A1 | 12/2005 | Hall et al. |
| 2005/0285751 A1 | 12/2005 | Hall et al. |
| 2005/0285752 A1 | 12/2005 | Hall et al. |
| 2005/0285754 A1 | 12/2005 | Hall e tal. |
| 2005/0286706 A1 | 12/2005 | Hall et al. |

* cited by examiner

CORROSION-RESISTANT DOWNHOLE TRANSMISSION SYSTEM

CROSS REFERENCE TO RELATED APPLICATIONS

The present invention is a continuation-in-part of U.S. patent application Ser. No. 10/604,812 filed Aug. 19, 2003 now U.S. Pat. No. 7,064,676, the entire disclosure of which is incorporated by reference herein. U.S. patent application Ser. No. 10/604,812 is a continuation of U.S. patent application Ser. No. 09/816,766 filed on Mar. 23, 2001, now U.S. Pat. No. 6,670,880 issued Dec. 30, 2003, the entire disclosure of which is incorporated by reference herein. Said application Ser. No. 09/816,766 is a continuation-in-part of U.S. patent application Ser. No. 09/619,084, filed Jul. 19, 2000 now abandoned, the entire disclosure of which was incorporated by reference in U.S. patent application Ser. No. 09/816,766, and the specification and drawing figures of which portions are herein copied.

BACKGROUND OF THE INVENTION

Background

The goal of accessing data from a drill string has been expressed for more than half a century. As exploration and drilling technology has improved, this goal has become more important in the industry for successful oil, gas, and geothermal well exploration and production. For example, to take advantage of the several advances in the design of various tools and techniques for oil and gas exploration, it would be beneficial to have real time data such as temperature, pressure, inclination, salinity, etc. Several attempts have been made to devise a successful system for accessing such drill string data. However, due to the complexity, expense, and unreliability of such systems, many attempts to create such a system have failed to achieve significant commercial acceptance.

In U.S. Pat. No. 6,844,498 issued to Hall et al. ("Hall"), the inventors disclosed a downhole "data transmission system" that overcomes many of the problems and limitations of the prior art. In the Hall system, data is transmitted in real time along the drill string by way of network hardware integrated directly into the drill string. This network hardware enables high-speed communication between various tools and sensors located along the drill string with surface analysis, diagnostic, and control equipment.

One obstacle to implementing a "downhole transmission system" is the corrosive nature of a downhole drilling environment. With the exception of some precious metals, pure metals are rarely found in nature. Most metals are encountered in their natural state as stable ores such as oxides, carbonates, or sulfides. A significant amount of energy is needed to convert ores, such as iron oxide, into usable iron or steel alloys. With time, these metals will corrode by recombining with oxygen, chlorine, sulfur, fluorine, or other corrosive agents to return to their more natural and stable form. As a result, steel and other metals that make up the drill string are gradually disintegrated and deteriorated by the corrosive downhole environment.

Formation fluids, drilling mud, stress corrosion, and erosion from cuttings may all contribute to drill string corrosion. Oxygen, an important contributor to corrosion, is primarily introduced at the drilling stage by way of oxygen-contaminated fluids. Likewise, many untreated drilling muds, depending of their makeup, will corrode drilling and mud-handling equipment. Water and carbon dioxide can also cause severe corrosion. Acids, often useful in reducing formation damage or removing scale, will readily corrode metals. When water and acid gases such as $CO_2$ or $H_2S$ are present, these gases may dissolve in the water to create corrosive acids. Rocks, sand, and other abrasives passing through or rubbing against the drill string may also cause significant wear.

Corrosion rates also increase as salinity increases up to approximately five percent of sodium chloride. Sodium chloride levels above five percent tend to reduce the solubility of oxygen in the water and thus actually lower corrosion rates. Additionally, higher temperatures encountered downhole tend to accelerate the corrosion rate, as do higher flow rates through the drill string. All of these factors contribute to the corrosion of downhole drilling equipment and the consequences in terms of equipment failure, down time, and replacement costs.

To reduce corrosion, the central bore of drill pipe if often coated with baked resins or fusion-bonded epoxies. Nevertheless, when these coatings have worn away, corrosion may advance rapidly. In other cases, chemicals known as scavengers are added to the drilling mud to bond with oxygen in the mud to reduce its corrosivity. A high pH level may also be maintained in the drilling mud to neutralize corrosive acids. Likewise, inhibitors may be added to the drilling mud to retard undesirable corrosive reactions. Finally, cathodic protection may prevent corrosion by using an electrical current to counteract electrochemical corrosion.

Because of the corrosive downhole environment, network and other communications hardware integrated into the drill string (as described in the Hall patent) may be especially sensitive to corrosion. A communications failure resulting from corrosion at any point along the drill string may interrupt or break the transmission path and the corresponding flow of data. Accordingly, what are needed are apparatus and methods for protecting downhole networking and communications hardware from corrosion. What are also needed are apparatus and methods for protecting certain downhole transmission components from corrosion while maintaining the electrical conductivity thereof.

SUMMARY OF THE INVENTION

The present invention has been developed to provide apparatus and methods for reducing corrosion in downhole transmission systems that overcome many or all of the above-discussed problems.

Consistent with the foregoing, and in accordance with the invention as embodied and broadly described herein, an apparatus is disclosed in one aspect of the present invention as including a downhole tool having a pin end, a box end, and an annular recess formed in the box end or the pin end. An annular transmission element is installed in the annular recess. The annular transmission element includes an annular housing that is electrically conductive and is adapted to electrically contact the annular recess. A coating that is both electrically conductive and corrosion-resistant is attached to the annular recess.

In certain embodiments, the coating may include a material such as, nickel, cobalt, alloys, mixtures, and compounds, or combinations thereof having a higher corrosion-resistance than the underlying base metal. Likewise, the coating may be attached using a process including but not limited to electroplating, electroless plating, cladding, hot dipping, galvanizing, or the like. In certain embodiments, an undercoating may be applied to the underlying surface before the coating is attached.

In certain embodiments, the annular housing may be characterized as having a first contact and the annular recess may be characterized as having a second contact in contact with the first contact. Because the annular housing may move with respect to the annular recess, the first contact may be adapted to slide or move with respect to the second contact. In selected embodiments, a lubricant may be deposited on the contact surfaces to reduce wear therebetween.

In certain embodiments, the diameter of the annular housing may be slightly smaller than the diameter of the annular recess. When the annular housing is installed into the annular recess, this slight size difference may create enough force to keep the contact surfaces pressed together. The slight size difference may also be sufficient to create a bias (i.e., a spring-like force) between the annular housing and the annular recess that urges the annular housing out of the annular recess. In certain embodiments, corresponding shoulders may be formed on the annular housing and in the annular recess to keep the annular housing retained within the recess.

In another embodiment, an apparatus in accordance with the invention may include a downhole tool and a data transmission path incorporated into the downhole tool. The data transmission path may include one or more contact surfaces providing electrical continuity to the data transmission path. A coating is attached to one or more of the contact surfaces which makes the contact surfaces more resistant to corrosion while maintaining the electrical conductivity of the contacts.

In certain embodiments, the coating includes a material such as cobalt, nickel, alloys, mixtures, compounds, combinations or the like. Likewise, the coating may be applied to the contact using a process including but not limited to electroplating, electroless plating, cladding, hot dipping, galvanizing, or the like. In some cases, an undercoating may be applied before attaching the coating.

In another embodiment, an apparatus in accordance with the invention may include a downhole tool having a first end, a second end, and an annular recess formed in at least one of the first end and the second end. An annular transmission element is installed in the annular recess. The annular transmission element includes an electrically-conductive annular housing which resides in and electrically contacts the annular recess. A coating is attached to the annular housing, the annular recess, or both, and is adapted to increase their resistance to corrosion while maintaining electrical conductivity between the two.

Like the previous examples, the coating may include a material including but not limited to cobalt, nickel, and alloys thereof. Likewise, the coating may be applied using a process such as electroplating, electroless plating, cladding, hot dipping, galvanizing, or the like. The downhole tool may include a variety of downhole tools, such as drill pipe, downhole nodes, or other downhole tools known to those in the art or that are illustrated in this description.

The present invention provides apparatus and methods for reducing corrosion in downhole transmission systems. The features and advantages of the present invention will become more fully apparent from the following description and appended claims, or may be learned by the practice of the invention as set forth hereinafter.

BRIEF DESCRIPTION OF THE DRAWINGS

The foregoing and other features of the present invention will become more fully apparent from the following description, taken in conjunction with the accompanying drawings. Understanding that these drawings depict only typical embodiments in accordance with the invention and are, therefore, not to be considered limiting of its scope, the invention will be described with additional specificity and detail through use of the accompanying drawings in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The illustrated embodiments of the invention will be best understood by reference to the drawings, wherein like parts are designated by like numerals throughout. Furthermore, the described features, structures, or characteristics of the invention may be combined in any suitable manner in one or more embodiments. In the following description, numerous specific details are disclosed to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
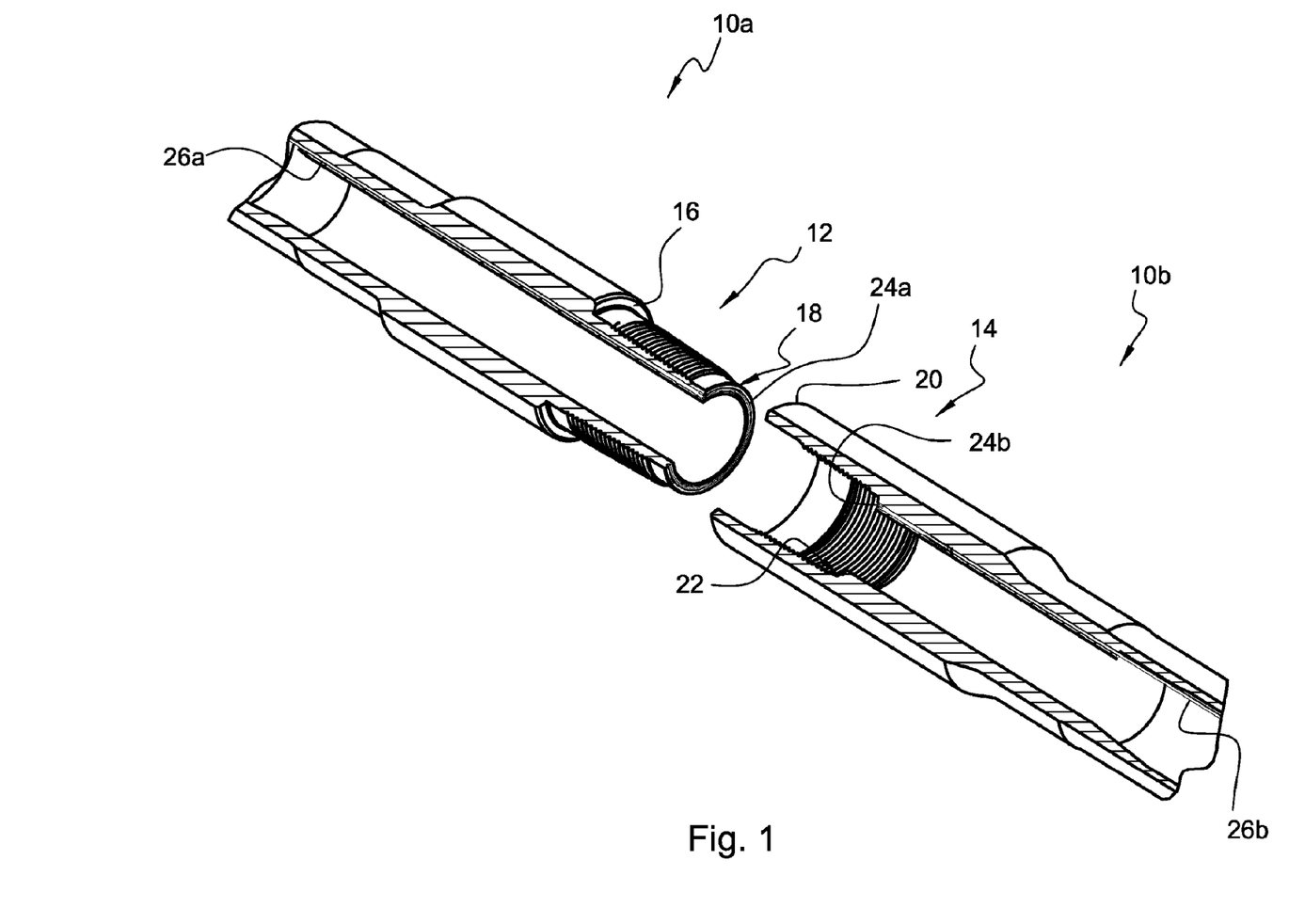
FIG. 1 is a cutaway perspective view of one embodiment of a section of drill pipe.

Referring to FIG. 1, sections 10a, 10b of drill pipe and other downhole tools 10a, 10b may include a pin end 12 and a box end 14 to allow multiple tools to be connected together to form a drill string. In certain embodiments, a pin end 12 may include an external threaded portion that screws into an internal threaded portion of the box end 14. When threading a pin end 12 into a box end 14, various shoulders may engage one another to provide structural support to the tool joint.

For example, in some types of drill pipe 10, a pin end 12 may include a primary shoulder 16 and a secondary shoulder 18. Likewise, the box end 14 may include a corresponding primary shoulder 20 and secondary shoulder 22. Drill pipe 10 that includes both a primary and secondary shoulder may be referred to as "double shouldered" pipe. A primary shoulder 16, 20 may provide the majority of the structural support to the tool joint. Nevertheless, a secondary shoulder 18, 22 may provide additional, although lesser, support or strength to the tool joint.

To transmit data across the tool joint, a transmission element 24a may be mounted on a mating surface 18 or shoulder 18 of the pin end 12. The transmission element 24a is adapted to transmit a signal to a corresponding transmission element 24b located on a mating surface 22 or shoulder 22 of the box end 14. Cables 26a, 26b, or other transmission media 26a, 26b, are used to transit signals from the transmission elements 24a, 24b along each of the downhole tools 10a, 10b.

Annular recesses are provided in the secondary shoulder 18 of the pin end 12 and the secondary shoulder 22 of the box end 14 to house each of the transmission elements 24a, 24b. The transmission elements 24a, 24b likewise have an annular shape and are mounted in the annular recesses around the shoulders 18, 22. Since a secondary shoulder 18 may contact or come very close to a secondary shoulder 22 of a box end 14, a transmission element 24a may sit substantially flush with the secondary shoulder 18 of the pin end 12 when the shoulders 18, 22 come together. Likewise, a transmission element 24b may sit substantially flush with the secondary shoulder 22 of the box end 14.

In selected embodiments, a transmission element 24a may transmit data to a corresponding transmission element 24b through direct electrical contact. In other embodiments, the transmission element 24a may convert an electrical signal to a magnetic field or magnetic signal. A corresponding transmission element 24b, located proximate the transmission element 24a, may detect the magnetic field. This magnetic field may induce an electrical signal in the transmission element 24b. This electrical signal may then be transmitted from the transmission element 24b by way of a cable 26b routed along the drill pipe 10b or downhole tool 10b.

Figure 2:
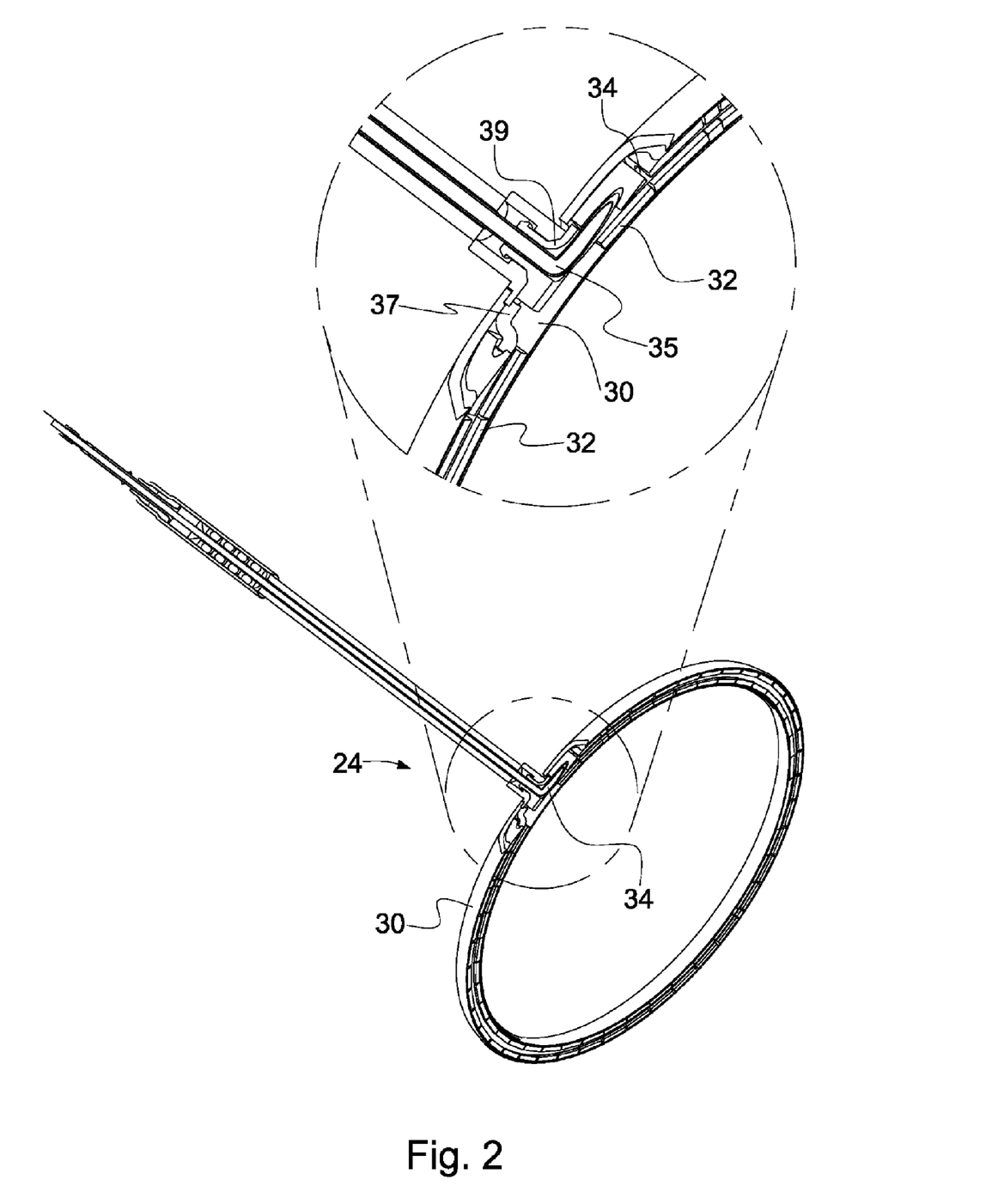
FIG. 2 is a perspective view of one embodiment of an annular transmission element in accordance with the invention.

Referring to FIG. 2, an enlarged view of one embodiment of a transmission element 24 as depicted in FIG. 1 is illustrated. As illustrated, the transmission element 24 may have an annular shape to circumscribe the secondary shoulders 18, 22 of the downhole tools 10a, 10b. As will be described in more detail in the description of FIG. 3, the transmission element 24 may include an outer housing 30 that forms an open channel. A coiled conductor 34 forming one or more loops may be routed through the housing 30. One or more magnetically-conducting and electrically insulating elements 32 may separate the conductor 34 from the housing 30. A transmission element 24 as well as other details of a downhole transmission system as illustrated herein are described in further detail in U.S. Pat. No. 6,844,498 to Hall et al., which is herein incorporated by reference in its entirety.

In selected embodiments, one end 35 of the conductive coil 34 may be connected to the cable 26 routed through the downhole tool 10. For example, if the cable 26 is a coaxial cable, the end 35 may be connected to the conductive core. The other end 37 of the coil 34, on the other hand, may provide a return path for current traveling through the coaxial core. In certain embodiments, a retention bridge 39 may be used to hold the ends 35, 37 of the conductive coil 34 in place. The retention bridge 39 may be constructed of an insulating material, such as a plastic, ferrite, or ceramics, to keep the ends 35, 37 of the coil 34 electrically isolated.

To provide a return path for current flowing through the coil 34, the end 37 of the coil 34 may be in electrical contact with the annular housing 30 by welding, brazing or other means. Likewise, the annular housing 30 is in contact with the annular recess (not shown) of the downhole tool 10. In this manner, the body of the downhole tool 10 provides the current return path.

To provide reliable transmission along the downhole tool 10, it is important to maintain electrical continuity in the circuit, which includes the cable 26, the conductive coil 34, and the return path through the annular housing 30 and the downhole tool 10. Any break or short in the circuit can disrupt or break the transmission path used to transmit data signals along the drill string. Maintaining this continuity may be especially difficult downhole due to the highly corrosive nature of the downhole drilling environment. If not properly treated, corrosion will attack the electrical contact surfaces of the circuit, possibly breaking or interrupting the circuit, or creating higher contact resistance. Any of these situations may interrupt or break the flow of data, thereby impairing the function of the downhole transmission system. Thus, in order to maintain satisfactory electrical contact, apparatus and methods are needed to prevent degradation of contact surfaces by reducing or preventing corrosion.

Figure 3:
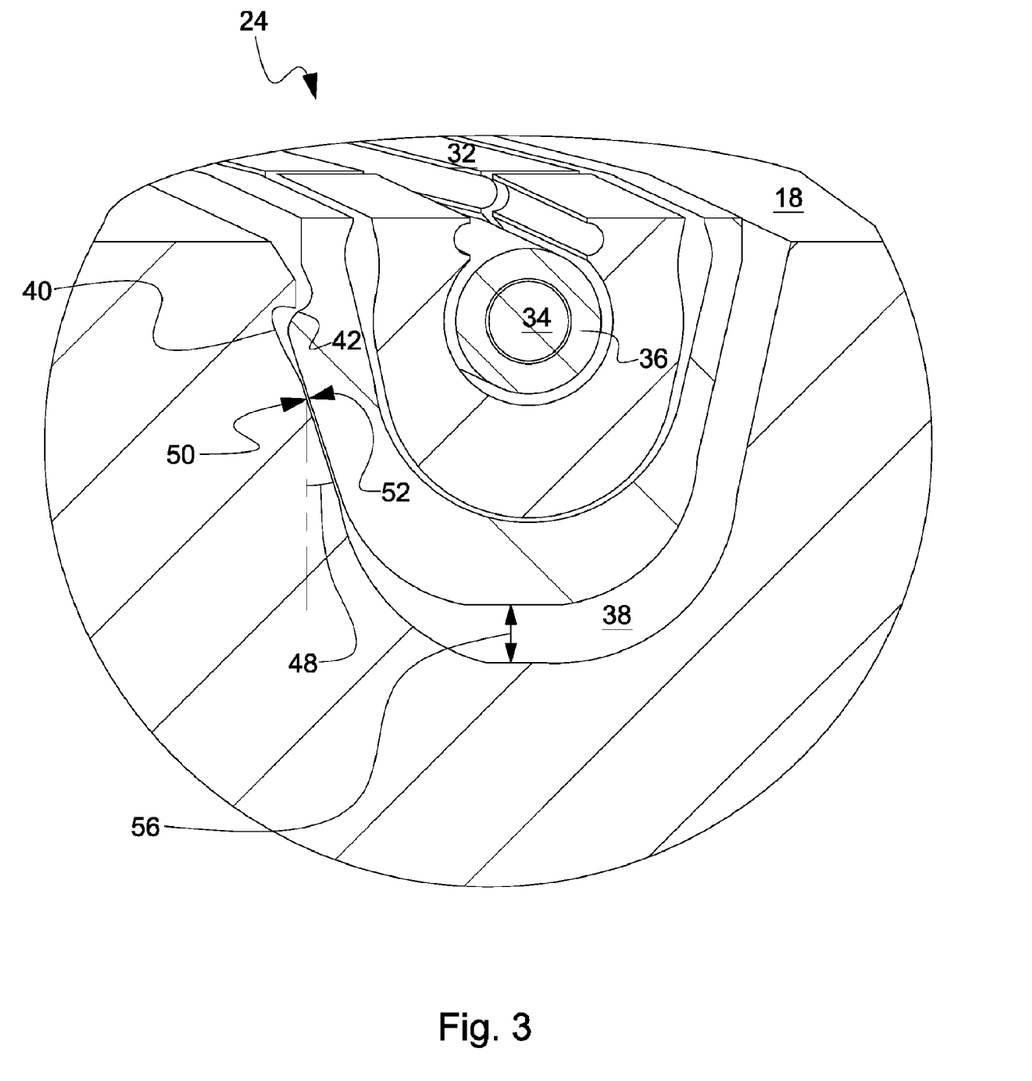
FIG. 3 is a perspective cross-sectional view of one embodiment of an annular transmission element installed in an annular recess formed in the box end or pin end of a downhole tool.

Referring to FIG. 3, as was previously stated, a transmission element 24 may include an annular housing 30 forming an open channel. A magnetically conductive, electrically insulating element 32 constructed from a material such as a ferrite composite or other material having suitable electrical and magnetic properties may reside in the annular housing 30. The element 32 may be formed in a U-shape to fit within the housing 30. A conductive coil 34 is routed through the U-shaped element 32 to carry electrical current. In selected embodiments, the conductive coil 34 is coated with an electrically insulating material 36.

As current flows through the coil 34, a magnetic flux or field may be created around the coil 34. The U-shaped element 32 may serve to contain the magnetic flux created by the coil 34 and prevent energy leakage into surrounding materials. The U-shape of the element 32 may also serve to transfer magnetic current to a similarly shaped element 32 in another transmission element 24. Since materials such as ferrite and composites containing ferrite may be quite brittle, the U-shaped elements 32 may be provided in segments to prevent cracking or breakage that might otherwise occur using a single piece of ferrite.

As was previously stated, an annular recess 38 may be provided in the secondary shoulder 18 of the downhole tool. Likewise, the transmission element 24 may be inserted into and retained within the recess 38. In selected embodiments, the recess 38 may include a locking mechanism to allow the housing 30 to enter the recess 38 while preventing its exit. For example, in one embodiment, a locking mechanism may simply be a groove 40 or ledge 40 formed within the recess 38. A corresponding shoulder 42 may be formed on the annular housing 30 such that the shoulder 42 engages the groove 40, thereby preventing the housing 30 from exiting the recess 38.

In order to close gaps or space that may be present between transmission elements 24 in the pin end 12 and box end 14, respectively, a transmission element 24 may be biased with respect to the secondary shoulder 18. That is, the transmission element 24 may be urged out of the recess 38.

In selected embodiments, angled surfaces 50, 52 of the recess 38 and housing 30, respectively, may provide this spring-like force.

For example, angled surfaces 50, 52 (forming an angle 48 with respect to a vector normal to the plane 18) may urge the housing 30 out of the recess 38. This may be accomplished by making the diameter of the annular housing 30 slightly smaller than the diameter of the recess 38. When the housing 30 is pressed into the recess 38, the smaller diameter of the housing 30 in combination with the sloping surfaces 50, 52 creates a spring-like force that urges the transmission element 24 out of the recess 38. Thus, a gap 56 may normally be present between the annular housing 30 and the recess 38. However, the groove 40 and shoulder 42 may limit the distance the transmission element 24 may leave the recess 38. Thus, although the transmission element 24 may be urged out of the recess 38, the exit distance may be limited and the transmission element 24 may be securely retained within the recess 38. Furthermore, the slightly smaller diameter of the annular housing 30 may keep the contact surfaces 50, 52 firmly pressed together. This is important since the electrical return path may rely on contact between the annular housing 30 and the recess 38.

As was previously mentioned, corrosion may adversely effect electrical contact surfaces in a downhole transmission system. Moreover, some contact surfaces may corrode more rapidly than others in accordance to their exposure to corrosive elements. Because of the open nature of the recess 38 and its location on the secondary shoulder 18 of the downhole tool 10, the contact surfaces 50, 52 may receive significant exposure to corrosive elements. For example, drilling mud, dirt, rocks, formation fluids, or other corrosive agents may be introduced into the recess 38 where they may corrode the contact surfaces 50, 52. Furthermore, because the contact surfaces 50, 52 may move relative to one another, the surfaces may experience some wear. Thus, apparatus and methods are needed to reduce or prevent corrosion and wear to the contact surfaces 50, 52, as well as other electrical contact surfaces in a downhole transmission system.

Figure 4:
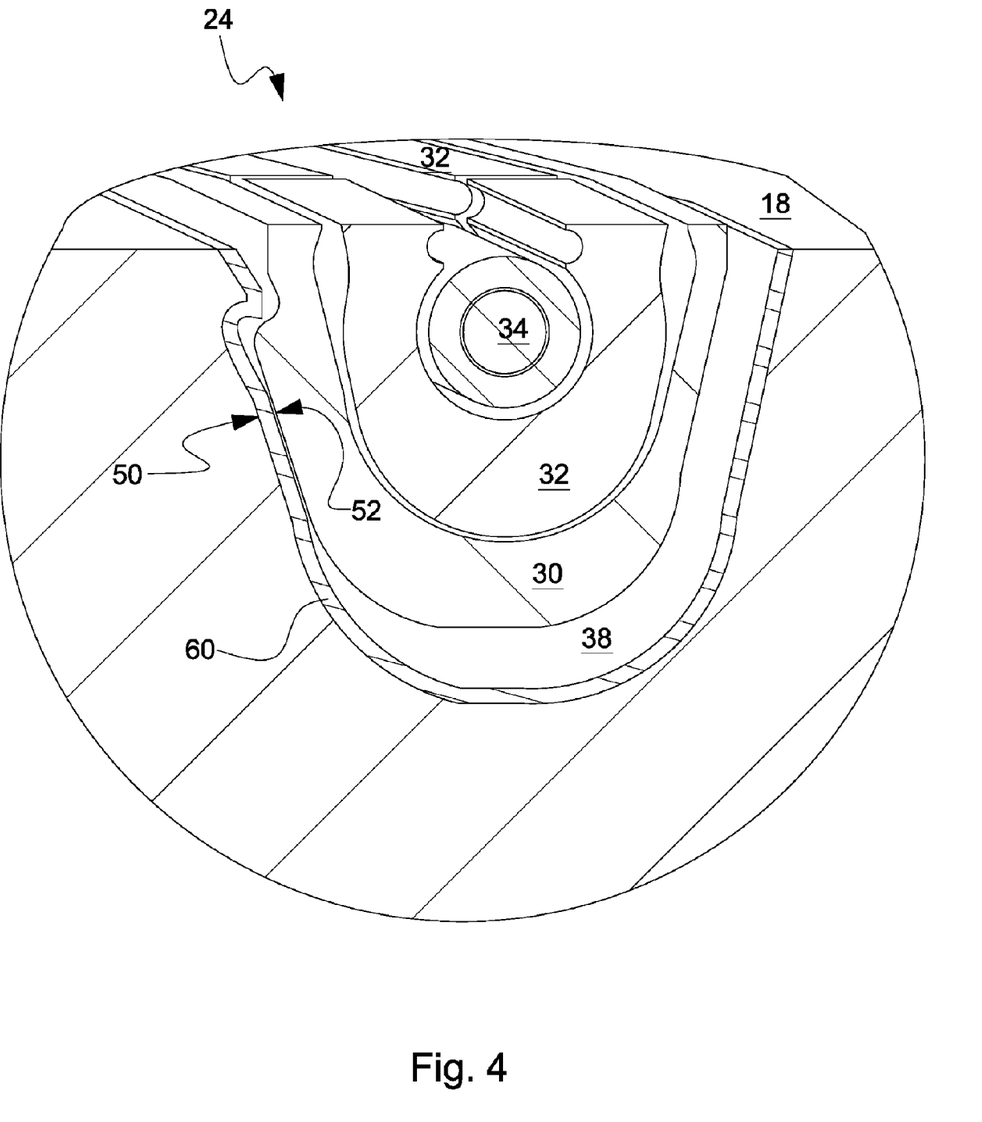
FIG. 4 is a perspective cross-sectional view showing one embodiment of a coating applied to the annular recess.

Referring to FIG. 4, in selected embodiments in accordance with the invention, one or more of the surfaces 50, 52, or any or all of the recess 38 may be coated with a corrosion-resistant but electrically conductive material. Various materials may be used to provide an electrically conductive and corrosion-resistant coating 60. For example, a coating 60 may include materials including but not limited to, nickel, cobalt, alloys, compounds, mixtures, and combinations, thereof, each of which may be more corrosion-resistant than the metals or alloys used to construct the downhole tool 10 or annular housing 30 of the transmission element 24. The choice of material for the coating 60 may depend on the ambient temperature downhole, the contaminants present, or the like.

Although the primary reason for the coating 60 may be increased corrosion resistance, a coating 60 may also be selected to increase the hardness of the underlying base metal, thereby providing improved wear resistance. In some cases, a coating 60 may be chosen to add lubricity and reduce friction at the contact interface. Furthermore, a coating 60 may be selected to effectively transmit a high-frequency signal without excessive reflective loss due to mismatched impedance or by introducing nonlinear effects into the circuit.

Various techniques may be used to apply a coating 60 in accordance with the invention to the recess 38, the annular housing 30, or both. For example, an electric current and galvanic reaction may be used to electroplate a coating material onto a base metal. A cladding process may also be effective to mechanically bond a coating material to a base metal. Likewise, base metals may be hot dipped in a molten bath to apply a coating material. Zinc may also be applied to metal using a galvanization process. Likewise, an auto-catalytic reaction may be used in an electroless plating process to apply a coating to a base metal without using electrical current. Such a system for electroless plating may be purchased from MacDermid, Inc. located at 245 Freight Street Waterbury, Conn. 06702.

Figure 7:
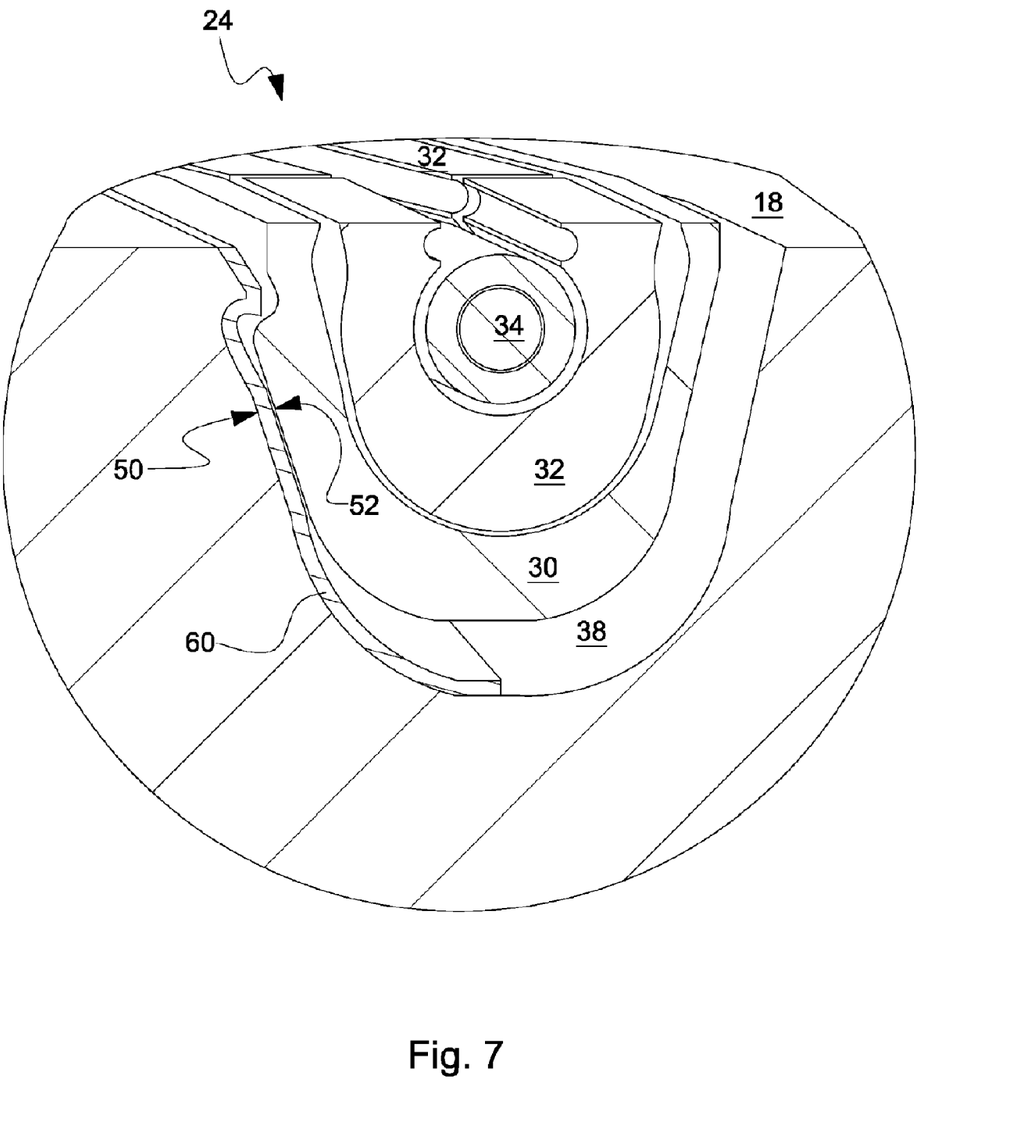
FIG. 7 is a perspective cross-sectional view showing an embodiment of a coating applied to the annular recess.
Figure 8:
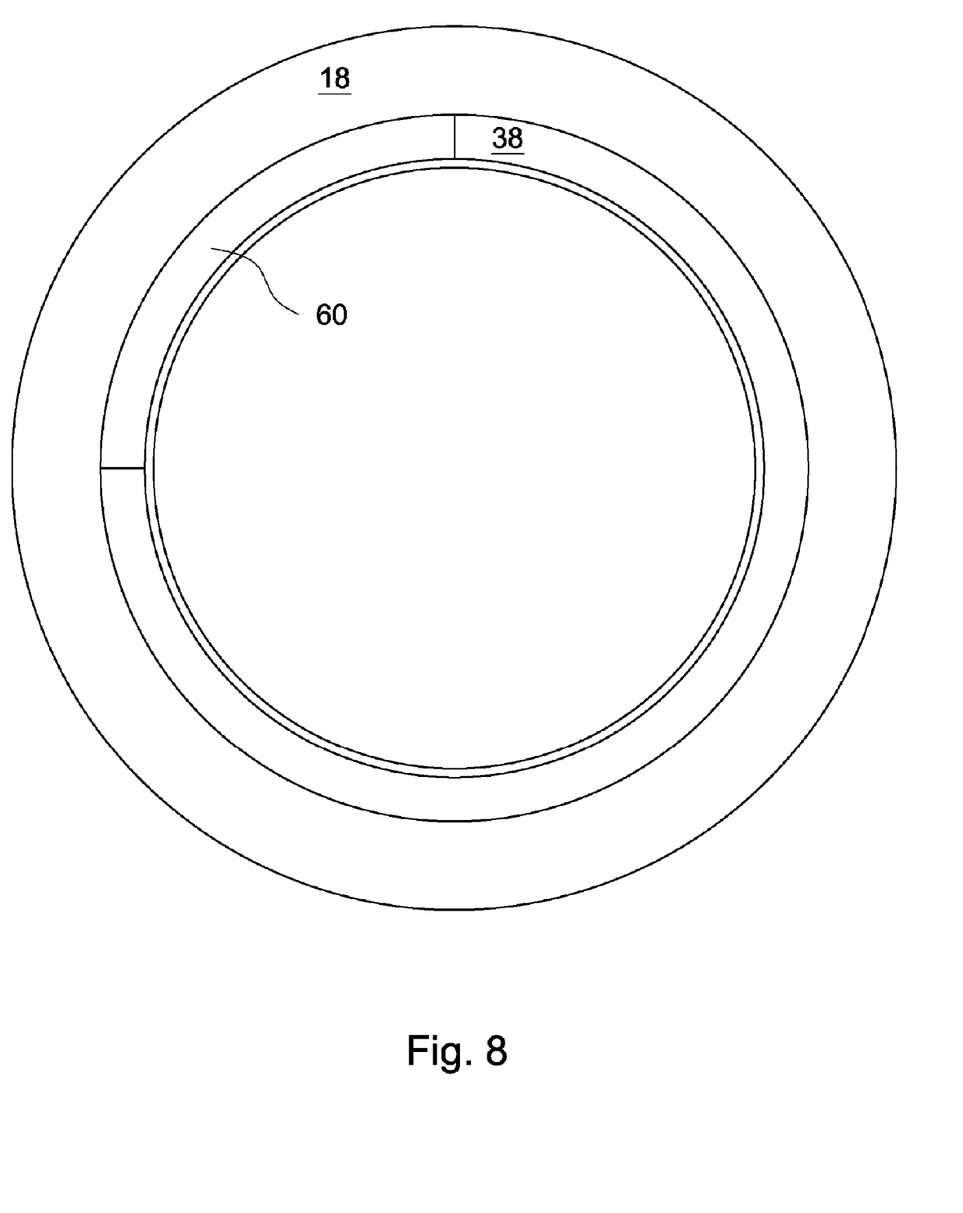
FIG. 8 is a perspective top view showing an embodiment of a coating applied to the annular recess.

The coating 60 may be applied to only a portion of the recess 38. FIG. 7 shows an embodiment where a single side of the recess 38 is coated. FIG. 8 shows a shoulder 18 of a downhole component comprising a coating 60 in the recess 38. The coating 60 in FIG. 8 only covers a quarter of the recess 38. It would be apparent to anyone of ordinary skill in the art that several configurations are possible. Only a small non-corroded area is required for electrical contact between the recess 38 and the annular housing 30.

A method for electroless nickel plating may comprise the steps of providing a clean surface within the groove, providing an aqueous solution within the groove, and sealing around the groove to prevent the solution from running over the groove. The aqueous solution may comprise sodium hypophosphite, as a reducing agent, and nickel. While not wanting to be bound by any theory, it is believed that the hydrogen atoms dissociate from the phosphorous ions near the surface of the groove allowing a nickel and phosphorous compound to bind to the surface of the groove. In other embodiments a reducing agent comprising boron may be used.

Various factors may influence the choice of an application process. For example, pores in the coating material may allow corrosion to more easily attack the underlying base metal. Electroless plating may be especially prone to porosity of the coating material, whereas techniques such as cladding may be generally pore free. Some coating materials may be applied thicker than others. To reduce the effects of porosity, in some cases an undercoating such as nickel may be applied before the coating 60 is attached. Thus, these factors may be considered when selecting an application process.

Figure 5:
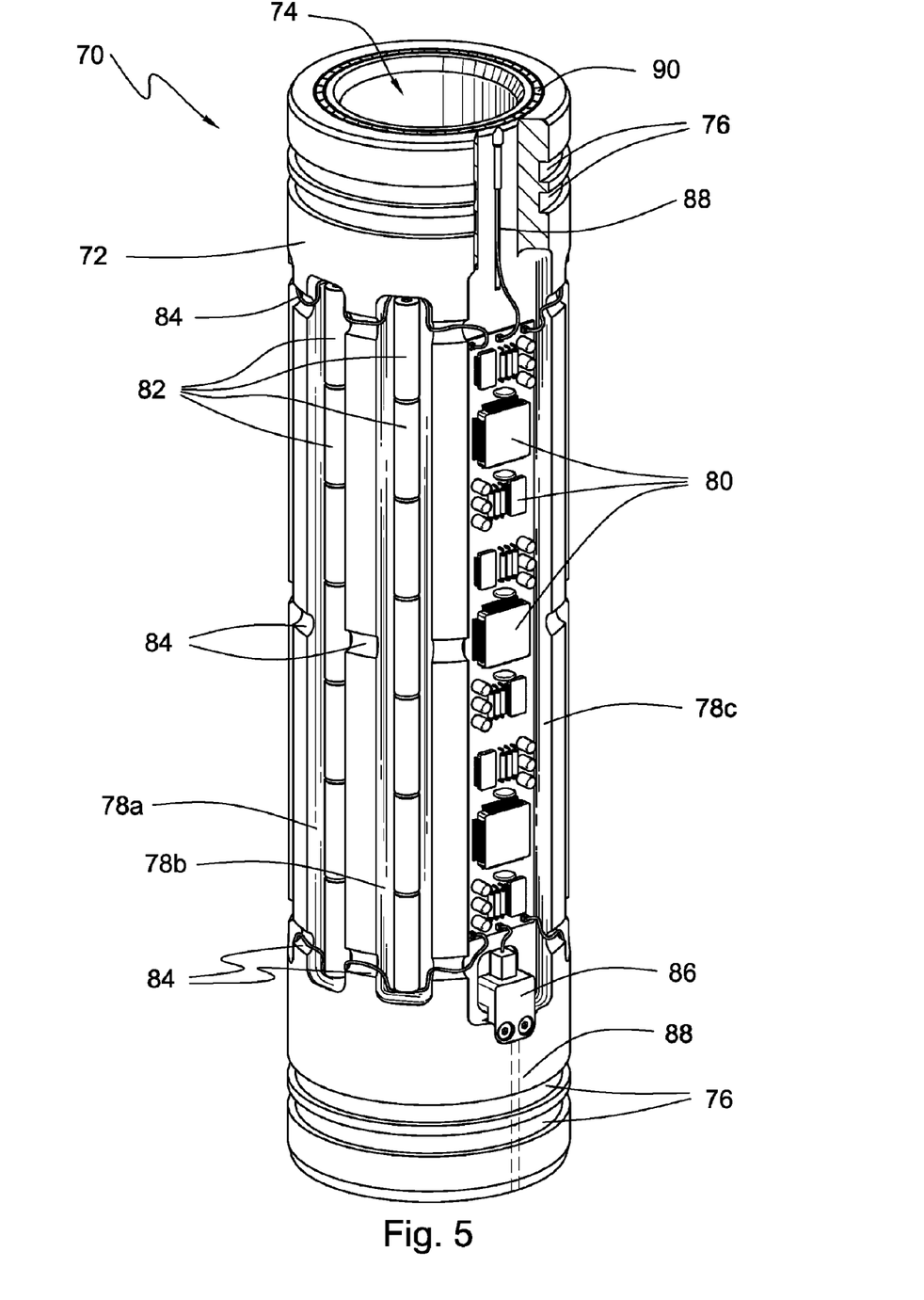
FIG. 5 is a perspective view of one embodiment of a network node for use in a downhole data transmission system.

Referring to FIG. 5, to transmit data along the drill string, nodes 70 may be placed at selected intervals along the drill string to act as relay points, amplifiers, points of data acquisition, repeaters, or the like. In certain embodiments, a node 70 may include a cylindrical housing 72 with a central bore 74 passing therethrough. The central bore 74 may have a diameter that is slightly smaller than the inner bore diameter of a typical section of drill pipe 10 to accommodate and provide space to components inside the node 70. In certain embodiments, the node 70 may be inserted into a host downhole tool 100 as will be described in more detail in the description of FIG. 6. Thus, the node 70 may be removed or inserted as needed to access or service components located therein. The cylindrical housing 72 may be constructed of any suitable material including steel, aluminum, or other metals or alloys capable of withstanding the pressures, stresses, temperatures, and abrasive nature of a downhole environment.

In selected embodiments, the node 70 may include one or several grooves 76 or seal contact surfaces 76 to seal the node 70 within a host downhole tool 100. Seals inserted into the seal contact surfaces 76 or grooves 76 may prevent fluids such as drilling mud, lubricants, oil, water, and the like from contaminating circuitry or components inside the node 70.

Moreover, other substances such as dirt, rocks, gasses, and the like, may also be prevented entry.

In selected embodiments, the node 70 may include one or several recesses 78a-c to house various components inside the node 70. One or more recesses 78c may contain node circuitry 80 as well as downhole tools and sensors that may fit in the recesses 78c. Other recesses 78a, 78b may be used for batteries 82 or other components. Channels 84 may be milled or formed in the cylindrical housing 72 to provide for the routing of wires between recesses 78a-c. In selected embodiments, a connector 86 may be used to connect node circuitry 80, as well as other tools or sensors located inside the node 70, to a transmission line 88 traveling through the node 70. In certain embodiments, a transmission element 90, like that illustrated in FIGS. 2 through 4, may be installed in the end of the node 70 to receive and transmit data. Likewise, as explained in the description of FIG. 4, the recess accommodating the transmission element 90 may be coated to maintain electrical conductivity while preventing or reducing corrosion.

Figure 6:
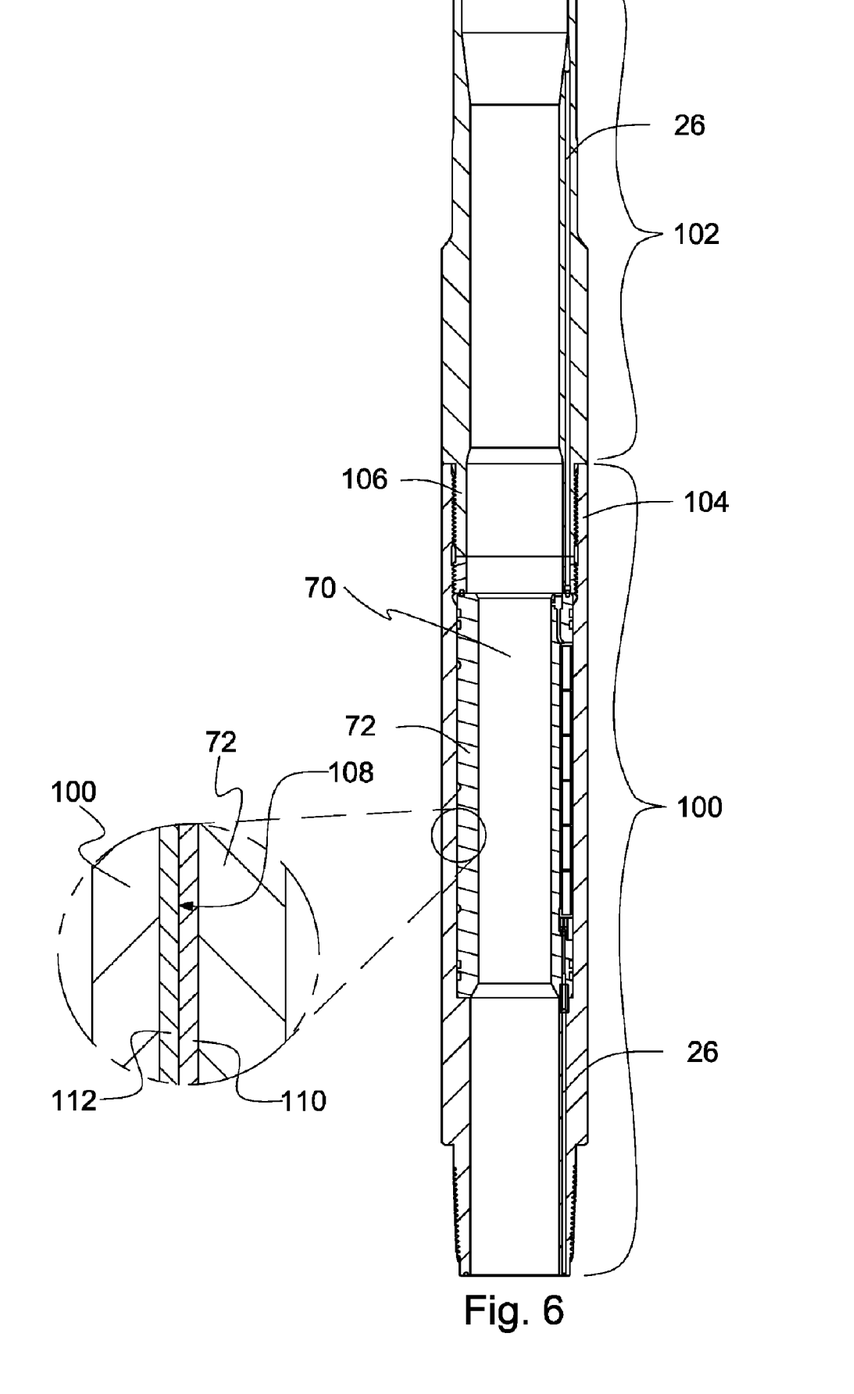
FIG. 6 is a cross-sectional view of one embodiment of a downhole tool adapted to accommodate a network node as illustrated in FIG. 5.

Referring to FIG. 6, while continuing to refer generally to FIG. 5, in selected embodiments, a downhole tool 100 may be adapted to accommodate a node 70. This may allow the distribution of nodes 70 at selected intervals along a drill string. For example, in selected embodiments, a node 70 may be inserted into a drill tool 100 adapted to receive the node 70. This tool 100 may include a threaded portion 104, such as a box end 104, to receive the pin end 106 of another downhole tool 102. As illustrated, a transmission line 26 may be used carry data up and down the drill string from the node 70. Because the node 70 fits inside the central bore of the downhole tool 100, the node's components, including node circuitry 80, batteries 82, or the like, may be protected from the downhole environment.

The implementation illustrated in FIG. 6 simply provides one example of downhole tools 100, 102 and other structures that may be used to accommodate a node 70 in accordance with the invention. As such, the illustrated embodiment is presented merely by way of example and is not intended to limit the node's implementation to this embodiment. In fact, a wide variety of different implementations may be possible and, therefore, fall within the scope of the present invention.

Like the downhole tools 10a, 10b described in FIG. 1, the housing 72 of the node 70 may provide the return path for current flowing through the transmission line 26. This return path may travel through the housing 72 and the downhole tool 100 that accommodates the housing 72. Thus, in certain embodiments, reliable electrical contact between the node housing 72 and the host downhole tool 100 may be needed to provide a continuous return path.

Like the previous examples described herein, downhole corrosion and contaminants may degrade or deteriorate the contact interface 108 between the downhole tool 100 and the node 70. Thus, to provide a reliable return path, apparatus and methods are needed to maintain and protect the contact interface 108. In certain embodiments in accordance with the invention, the node housing 72 may be coated 110 with an electrically conductive, corrosion-resistant material to protect the contact interface 108 and maintain a reliable return path. Likewise, in certain embodiments, all or a portion of the inside surface of the downhole tool 100 may be coated 112. As described in FIG. 4, the coating 110, 112 may include any of numerous metals or alloys that are more corrosion-resistant than the underlying base metal or alloy used to construct the node housing 72 or the host downhole tool 100. Likewise, various processes known in the art may be used to apply a coating in accordance with the invention.

As discussed herein, a coating in accordance with the invention may be applied to the annular recess 38 in the pin or box end of a downhole tool 10, the annular housing 30 of a transmission element 24, the housing 72 of a node 70, the downhole tool 100 hosting the node 70, or a combination thereof. These embodiments are merely exemplary in nature and are not intended to be an exhaustive list of components in a downhole transmission system where a coating may be useful. Indeed, an electrically conductive, corrosion-resistance coating may be applied to virtually all contact surfaces in a downhole transmission system, especially those surfaces that receive significant exposure to corrosive or contaminating agents present in a downhole or other environment.

The present invention may be embodied in other specific forms without departing from its essence or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

What is claimed is:

1. An apparatus comprising:
    a downhole tool comprising a pin end, a box end, and an annular recess formed in at least one of the box end and the pin end;
    an annular transmission element comprising an electrically-conductive annular housing, wherein the housing resides in and electrically contacts the annular recess; and
    a coating attached to at least one of the annular housing the annular recess, wherein the coating is electrically-conductive and corrosion-resistant,
    wherein the coating comprises a material selected from the group consisting of nickel, cobalt, mixtures thereof, compounds thereof, and combinations thereof.

2. The apparatus of claim 1, wherein the coating is attached using a process selected from the group consisting of electroplating, electroless plating, cladding, hot dipping, and galvanizing.

3. The apparatus of claim 1, further comprising an undercoating between the coating and the at least one of the housing and the recess.

4. The apparatus of claim 1, wherein:
    the annular housing comprises a first contact and the annular recess comprises a second contact in contact with the first contact; and
    the first contact is adapted to slide with respect to the second contact.

5. The apparatus of claim 4, further comprising a lubricant between the first and second contact surfaces.

6. The apparatus of claim 1, wherein the diameter of the annular housing is smaller than the diameter of the annular recess to create a force between the first and second contact surfaces.

7. The apparatus of claim 1, wherein the annular transmission element further comprises:
    at least one electrical conductor disposed within the annular housing; and a magnetically-conductive, electrically-insulative material disposed between the annular housing and the electrical conductor, preventing direct contact therebetween.

8. The apparatus of claim 1, wherein the annular transmission element is biased with respect to the annular recess.

9. The apparatus of claim 1, wherein the annular housing further comprises a shoulder configured to engage a corresponding shoulder formed inside the annular recess.

10. An apparatus comprising:
- a downhole tool comprising a first end, a second end, and an annular recess formed in at least one of the first end and the second end;
- an annular transmission element comprising an electrically-conductive annular housing, wherein the housing resides in and electrically contacts the annular recess; and
- a coating attached to at least one of the annular housing the recess, wherein the coating is electrically-conductive and corrosion-resistant
- wherein the coating comprises a material selected from the group consisting of nickel, nickel alloy, cobalt, and cobalt alloys.

11. The apparatus of claim 10, wherein the coating is attached using a process selected from the group consisting of electroplating, electroless plating, cladding, hot dipping, and galvanizing.

12. The apparatus of claim 10, wherein the downhole tool is selected from the group consisting of a section of drill pipe and a downhole node.

13. The apparatus of claim 10, wherein the annular transmission element further comprises:
- at least one electrical conductor disposed within the annular housing; and
- a magnetically-conductive, electrically-insulative material disposed between the annular housing and the electrical conductor, preventing direct contact therebetween.

14. The apparatus of claim 10, wherein the annular transmission element is biased with respect to the annular recess.

* * * * *